US010142357B1

United States Patent
Tamersoy et al.

(10) Patent No.: US 10,142,357 B1
(45) Date of Patent: Nov. 27, 2018

(54) SYSTEMS AND METHODS FOR PREVENTING MALICIOUS NETWORK CONNECTIONS USING CORRELATION-BASED ANOMALY DETECTION

(71) Applicant: Symantec Corporation, Mountain View, CA (US)

(72) Inventors: Acar Tamersoy, Culver City, CA (US); Kevin Roundy, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 41 days.

(21) Appl. No.: 15/385,963

(22) Filed: Dec. 21, 2016

(51) Int. Cl.
*H04L 29/06* (2006.01)
*G06N 99/00* (2010.01)

(52) U.S. Cl.
CPC ....... *H04L 63/1416* (2013.01); *G06N 99/005* (2013.01); *H04L 63/1425* (2013.01)

(58) Field of Classification Search
CPC ............ H04L 63/1416; H04L 63/1425; G06N 99/005
See application file for complete search history.

(56) References Cited

U.S. PATENT DOCUMENTS 9,800,596 B1 * 10/2017 Chiles .................... H04L 63/105
9,823,954 B2 * 11/2017 Chen ................... G06F 11/0706
2010/0138919 A1 * 6/2010 Peng ................. H04L 29/12009 726/22
2014/0153396 A1 * 6/2014 Gopalan ............... H04L 41/142 370/235
2014/0208427 A1 * 7/2014 Grier .................... H04L 63/1416 726/23
2015/0009840 A1 * 1/2015 Pruthi .................... H04L 43/106 370/252

(Continued)

OTHER PUBLICATIONS

Kevin M. Carter et al.; Temporally Oblivious Anomaly Detection on Large Networks Using Functional Peers; https://www.II.mit.edu/mission/cybersec/publications/publication-files/full_papers/2010_11_03_Carter_IMC_FP.pdf; Dec. 20, 2016; Nov. 1-3, 2010.

(Continued)

*Primary Examiner* — Yonas A Bayou
(74) *Attorney, Agent, or Firm* — Fisher Broyles, LLP

(57) ABSTRACT

The disclosed computer-implemented method may include (i) monitoring computing activity, (ii) detecting, during a specific time period, at least one malicious network connection that involves a computing device within a network, (iii) determining that no malicious network connections involving the computing device were detected during another time period, (iv) identifying a feature of the computing activity that (a) occurred during the specific time period and (b) did not occur during the other time period, (v) determining that the feature is likely indicative of malicious network activity due at least in part to the feature having occurred during the specific time period and not having occurred during the other time period, and in response to detecting the feature at a subsequent point in time, (vi) performing a security action on a subsequent network connection attempted around the subsequent point in time. Various other methods, systems, and computer-readable media are also disclosed.

20 Claims, 8 Drawing Sheets

(56) References Cited

U.S. PATENT DOCUMENTS

| | | | |
|---|---|---|---|
| 2015/0135262 A1* | 5/2015 | Porat | G06F 21/552 726/1 |
| 2017/0063908 A1* | 3/2017 | Muddu | H04L 63/1425 |

OTHER PUBLICATIONS

Prelert Solutions: IT Security Analytics; http://info.prelert.com/behavioral-analytics-solutions-for-it-security; Dec. 20, 2016.

Jordan Novet; Microsoft launches Advanced Threat Analytics out of preview following Aorato acquisition; http://venturebeat.com/2015/07/22/microsoft-launches-advanced-threat-analytics-out-of-preview-following-aorato-acquisition/; Dec. 20, 2016; Jul. 22, 2015.

Prasanta Gogoi, D K Bhattacharyya, B Borah and Jugal K Kalita, Sep. 27, 2009, http://gauss.ececs.uc.edu/Courses/c6055/pdf/anomaly.pdf.

Flowmon, https://www.flowmon.com/en/products/flowmon/anomaly-detection-system, Dec. 20, 2016.

CyberArk, http://www.cyberark.com/solutions/by-project/analytics-and-threat-detection/, Dec. 20, 2016.

Networks Using Functional Peers, https://www.ll.mit.edu/mission/cybersec/publications/publication-files/full_papers/2010_11_03_Carter_IMC_FP.pdf, Nov. 1-3, 2010.

Jordan Novet, Microsoft launces Advanced Threat Analytics out of preview following Aorato acquisition, http://venturebeat.com/2015/07/22/microsoft-launches-advanced-threat-analytics-out-of-preview-following-aorato-acquisition/.

Dell'Amico et al., Systems and Methods for Categorizing Security Incidents, U.S. Appl. No. 15/292,918, filed Oct. 13, 2016.

\* cited by examiner

| | Feature₁ | Feature₂ | ... | Featureᵢ | ... | Machine Category | # of Malicious Incidents |
|---|---|---|---|---|---|---|---|
| Machine_K – Day_L | 1 | 2 | ... | ... | | 1 | 3 |
| Machine_K – Day_{L+1} | 2 | 0 | ... | ... | | 1 | 0 |
| ⋮ | ⋮ | | | | | | |
| Machine_M – Day_N | ⋮ | | | | | 2 | ⋮ |

| | Feature$_1$ | Feature$_2$ | ... | Feature$_i$ | Machine Category | Deviation from Past | # of Malicious Incidents |
|---|---|---|---|---|---|---|---|
| Machine$_K$ – Day$_L$ | 1 | 2 | ... | ... | 1 | 0.95 | 3 |
| Machine$_K$ – Day$_{L+1}$ | 2 | 0 | ... | ... | 1 | 0 | 0 |
| ... | ... | | | | | | |
| Machine$_M$ – Day$_N$ | ... | | | | 2 | 0.01 | ... |

FIG. 6

SYSTEMS AND METHODS FOR PREVENTING MALICIOUS NETWORK CONNECTIONS USING CORRELATION-BASED ANOMALY DETECTION

BACKGROUND

Network connections may enable some computers to access other computers. While this functionality may increase accessibility, utility, and/or productivity among those computers, such network connections may expose and/or introduce those computers to certain vulnerabilities and/or security risks. For example, one computer may access another computer within an enterprise network using a protocol such as Secure SHell (SSH), Virtual Network Computing (VNC), and/or File Transfer Protocol (FTP). Such protocols may enable an attacker to perform and/or carry out password cracking, data harvesting, lateral movement, exfiltration, and/or other malicious actions in connection with those computers.

Unfortunately, some conventional security services may be unable to distinguish malicious network connections from benign network connections. Moreover, such security services may simply rely on ad-hoc rules based on human intuition rather than correlating malicious network connections with corresponding features. The instant disclosure, therefore, identifies and addresses a need for systems and methods for preventing malicious network connections using correlation-based anomaly detection.

SUMMARY

As will be described in greater detail below, the instant disclosure describes various systems and methods for preventing malicious network connections using correlation-based anomaly detection.

In one example, a method for preventing malicious network connections using correlation-based anomaly detection may include (i) monitoring computing activity within a network that includes a plurality of computing devices over a plurality of time periods, (ii) detecting, during a specific time period, at least one network connection that involves at least one of the computing devices within the network, (iii) determining that the network connection detected during the specific time period is malicious based at least in part on telemetry data collected from a plurality of security products related to the computing device, (iv) determining that no malicious network connections involving the computing device were detected during another time period, (v) identifying a feature of the computing activity that (a) occurred during the specific time period and (b) did not occur during the other time period, (vi) determining that the feature is likely indicative of malicious network activity due at least in part to the feature having occurred during the specific time period and not having occurred during the other time period, (vii) detecting the feature at a subsequent point in time and then, in response to detecting the feature at the subsequent point in time, (viii) performing at least one security action on a subsequent network connection attempted around the subsequent point in time.

In one embodiment, a system for preventing malicious network connections using correlation-based anomaly detection may include several modules stored in memory, including (i) a monitoring module that (a) monitors computing activity within a network that includes a plurality of computing devices over a plurality of time periods and (b) detects, during a specific time period, at least one network connection that involves at least one of the computing devices within the network, (ii) a determination module that (a) determines that the network connection detected during the specific time period is malicious based at least in part on telemetry data collected from a plurality of security products related to the computing device and (b) determines that no malicious network connections involving the computing device were detected during another time period, (iii) an identification module that identifies a feature of the computing activity that (a) occurred during the specific time period and (b) did not occur during the other time period. The determination module may also determine that the feature is likely indicative of malicious network activity due at least in part to the feature having occurred during the specific time period and not having occurred during the other time period. The monitoring module may also detect the feature at a subsequent point in time. In addition, the system may include a security module that performs at least one security action on a subsequent network connection attempted around the subsequent point in time in response to the detection of the feature at the subsequent point in time. Finally, the system may include at least one physical processor configured to execute the monitoring module, the determination module, the identification module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor computing activity within a network that includes a plurality of computing devices over a plurality of time periods, (ii) detect, during a specific time period, at least one network connection that involves at least one of the computing devices within the network, (iii) determine that the network connection detected during the specific time period is malicious based at least in part on telemetry data collected from a plurality of security products related to the computing device, (iv) determine that no malicious network connections involving the computing device were detected during another time period, (v) identify a feature of the computing activity that (a) occurred during the specific time period and (b) did not occur during the other time period, (vi) determine that the feature is likely indicative of malicious network activity due at least in part to the feature having occurred during the specific time period and not having occurred during the other time period, (vii) detect the feature at a subsequent point in time and then, in response to detecting the feature at the subsequent point in time, (viii) perform at least one security action on a subsequent network connection attempted around the subsequent point in time.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the instant disclosure.

FIG. 5 is an illustration of an example data set that identifies certain features that occurred during the same time period as certain malicious incidents.

FIG. 6 is an illustration of an example data set that identifies certain features that occurred during the same time period as certain malicious incidents.

Figure 1:
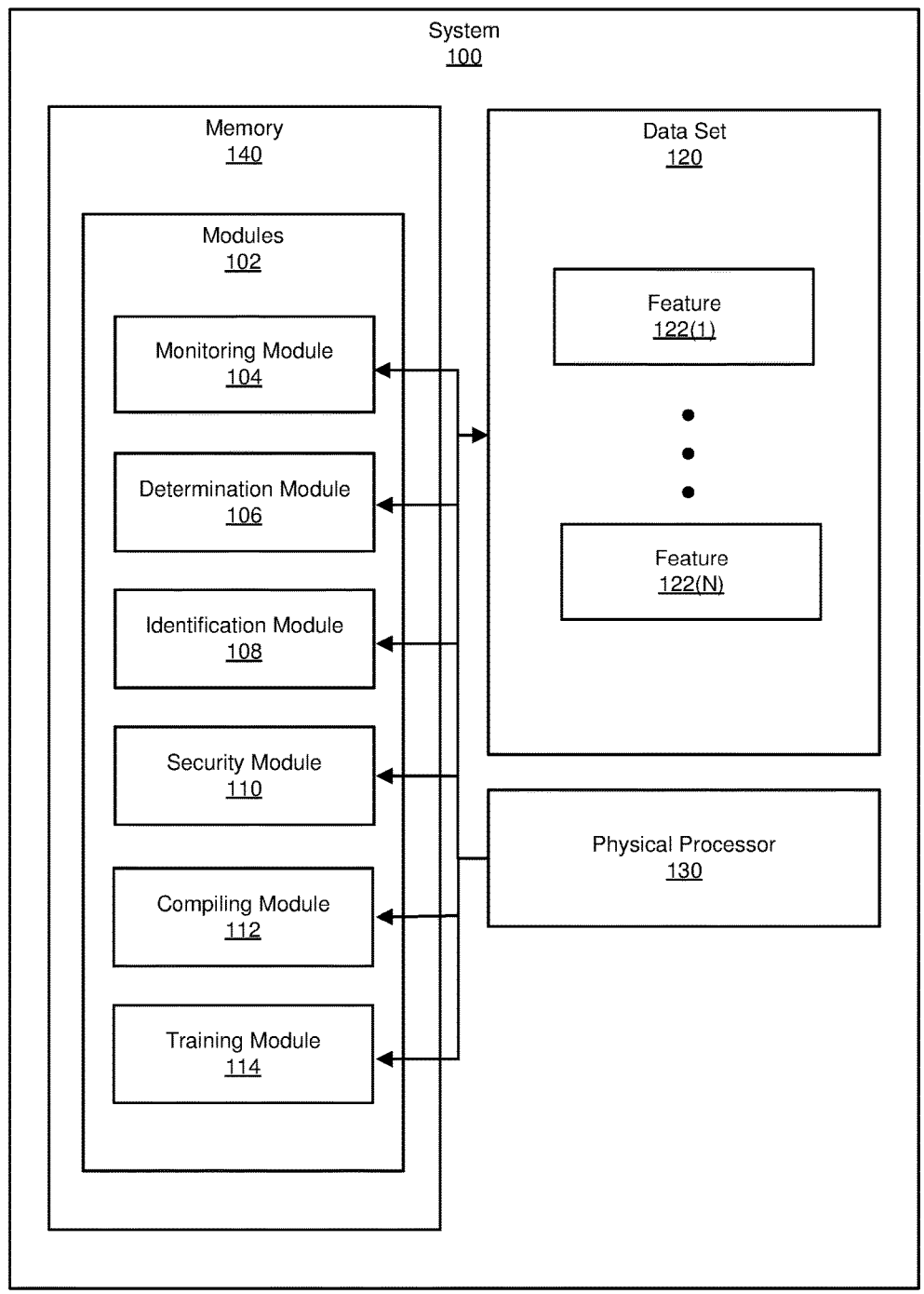
FIG. 1 is a block diagram of an example system for preventing malicious network connections using correlation-based anomaly detection.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preventing malicious network connections using correlation-based anomaly detection. As will be explained in greater detail below, the various systems and methods described herein may compile a data set that includes telemetry data and/or information from multiple security products implemented on individual machines within a network and/or across various machines within the network. The various systems and methods described herein may analyze and/or mine this data set to identify certain features indicative of malicious activity. In the event that these features occurred and/or were present in close time-proximity of detected network connections, the various systems and methods described herein may correlate these features with malicious activity and thus determine that the presence of these features is a sign that an existing or forthcoming network connection is likely malicious.

The compiled data set may include and/or identify certain features of computing activity that were detected during the same time periods as network connections that turned out to be malicious. This data set may also include and/or identify certain features of computing activity that occurred during time periods in which no malicious network connections were detected. The various systems and methods described herein may then train a malicious-anomaly-detection model that facilitates detecting subsequently attempted malicious network connections based at least in part on this data set.

By doing so, these systems and methods may be able to disambiguate and/or distinguish between malicious network connections and benign network connections or benign anomalies. As a result, these systems and methods may be able to improve the accuracy and/or precision of malicious-activity detection over conventional network security services. For example, these systems and methods may be able to leverage the data set compiled from multiple security products running within a network to establish data-driven rules and/or policies that facilitate accurate malicious-activity detection within that network, as opposed to simply relying on ad-hoc rules based on human intuition (such as the assumption that 10 failed login attempts within a certain period of time is indicative of a security breach and/or the assumption that outbound FTP flows that exceed a data threshold are indicative of a security breach), which often lead to high levels of false negatives and/or false positives.

Figure 2:
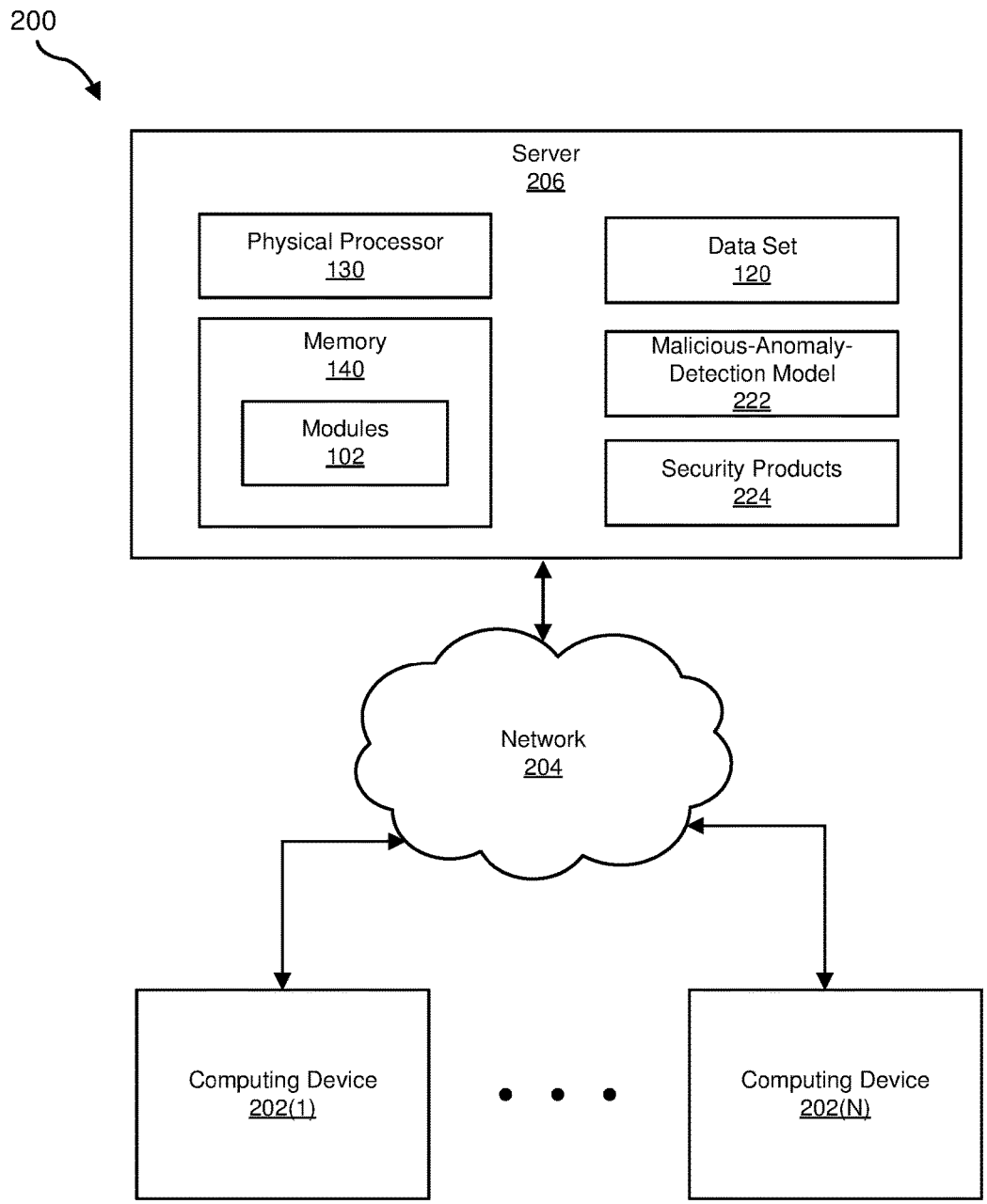
FIG. 2 is a block diagram of an additional example system for preventing malicious network connections using correlation-based anomaly detection.

The following will provide, with reference to FIGS. 1 and 2, detailed descriptions of example systems for preventing malicious network connections using correlation-based anomaly detection. Detailed descriptions of corresponding computer-implemented methods will be provided in connection with FIG. 3. Detailed descriptions of example data sets will be provided in connection with FIGS. 4-6. In addition, detailed descriptions of an example computing system and network architecture capable of implementing one or more of the embodiments described herein will be provided in connection with FIGS. 7 and 8, respectively.

FIG. 1 is a block diagram of an example system 100 for preventing malicious network connections using correlation-based anomaly detection. As illustrated in this figure, example system 100 may include one or more modules 102 for performing one or more tasks. As will be explained in greater detail below, modules 102 may include a monitoring module 104, a determination module 106, an identification module 108, security module 110, a compiling module 112, and a training module 114. Although illustrated as separate elements, one or more of modules 102 in FIG. 1 may represent portions of a single module or application (such as a Managed Security Service (MSS) and/or a Security Incident and Event Management (SIEM) system).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing devices 202(1)-(N) and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing malicious network connections using correlation-based anomaly detection. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

As illustrated in FIG. 1, example system 100 may also include one or more data sets, such as data set 120. Data set 120 generally represents any collection and/or compilation of data and/or information that identifies and/or is related to computing activity occurring within a network. In one example, data set 120 may include and/or identify features 122(1)-(N) of computing activity that occurred during different time periods (e.g., different days and/or 24-hour periods). Examples of features 122(1)-(N) include, without limitation, network connections, events, countries from which network traffic originated, the volume of certain remote access behaviors (such as SSH, VNC, and/or FTP), sequential behavior properties or constructs found in a data set, n-grams of sequential behavior properties or constructs, time of network connections (such as time of day, time of week, and/or Christmas timeframe), graph statistics (such as indegrees, outdegrees, and/or structures of 1 or 2 hop neighborhoods) extracted from a graph structure constructed using certain network connections, the number of internal and/or external machines connected to a computing device, the health and/or hygiene history of machines connected to a computing device, whether or not a user is physically present at a computing device (e.g., based on mouse input, keyboard input, differentiation between keyboard and mouse drivers, and/or virtual events that originate from a remote desktop), combinations or variations of one or more of the same, and/or any other suitable features of computing activity.

Example system 100 in FIG. 1 may be implemented in a variety of ways. For example, all or a portion of example system 100 may represent portions of example system 200 in FIG. 2. As shown in FIG. 2, system 200 may include computing devices 202(1)-(N) in communication with a server 206 via a network 204. In one example, all or a portion of the functionality of modules 102 may be performed by one or more of computing devices 202(1)-(N), server 206, and/or any other suitable computing system. As will be described in greater detail below, one or more of modules 102 from FIG. 1 may, when executed by at least one processor of computing devices 202(1)-(N) and/or server 206, enable computing devices 202(1)-(N) and/or server 206 to prevent malicious network connections using correlation-based anomaly detection.

For example, and as will be described in greater detail below, one or more of modules 102 may cause computing device 202(1) and/or server 206 to (i) monitor computing activity within a network that includes a plurality of computing devices over a plurality of time periods, (ii) detect, during a specific time period, at least one network connection that involves at least one of the computing devices within the network, (iii) determining that the network connection detected during the specific time period is malicious based at least in part on telemetry data collected from a plurality of security products related to the computing device, (iv) determine that no malicious network connections were detected during another time period, (v) identify a feature of the computing activity that (a) occurred during the specific time period and (b) did not occur during the other time period, (vi) determine that the feature is likely indicative of malicious network activity due at least in part to the feature having occurred during the specific time period and not having occurred during the other time period, (vii) detect the feature at a subsequent point in time and then, in response to detecting the feature at the subsequent point in time, (viii) perform at least one security action on a subsequent network connection attempted at or around the subsequent point in time.

Computing devices 202(1)-(N) generally represents any type or form of computing device capable of reading computer-executable instructions. In one example, computing devices 202(1)-(N) may include and/or represent client devices operating within an enterprise environment. Additional examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing devices.

Server 206 generally represents any type or form of computing device capable of collecting data, analyzing data, and/or distributing data in connection with malicious and benign network activity. In one example, server 206 may include and/or represent a security server that manages and/or oversees the security of one or more computing devices. Additional examples of server 206 include, without limitation, application servers, web servers, storage servers, and/or database servers configured to run certain software applications and/or provide various web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing devices 202(1)-(N) and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Although computing devices 202(1)-(N) and server 206 are illustrated external to network 204 in FIG. 2, these devices may alternatively represent part of and/or be included in network 204.

Figure 3:
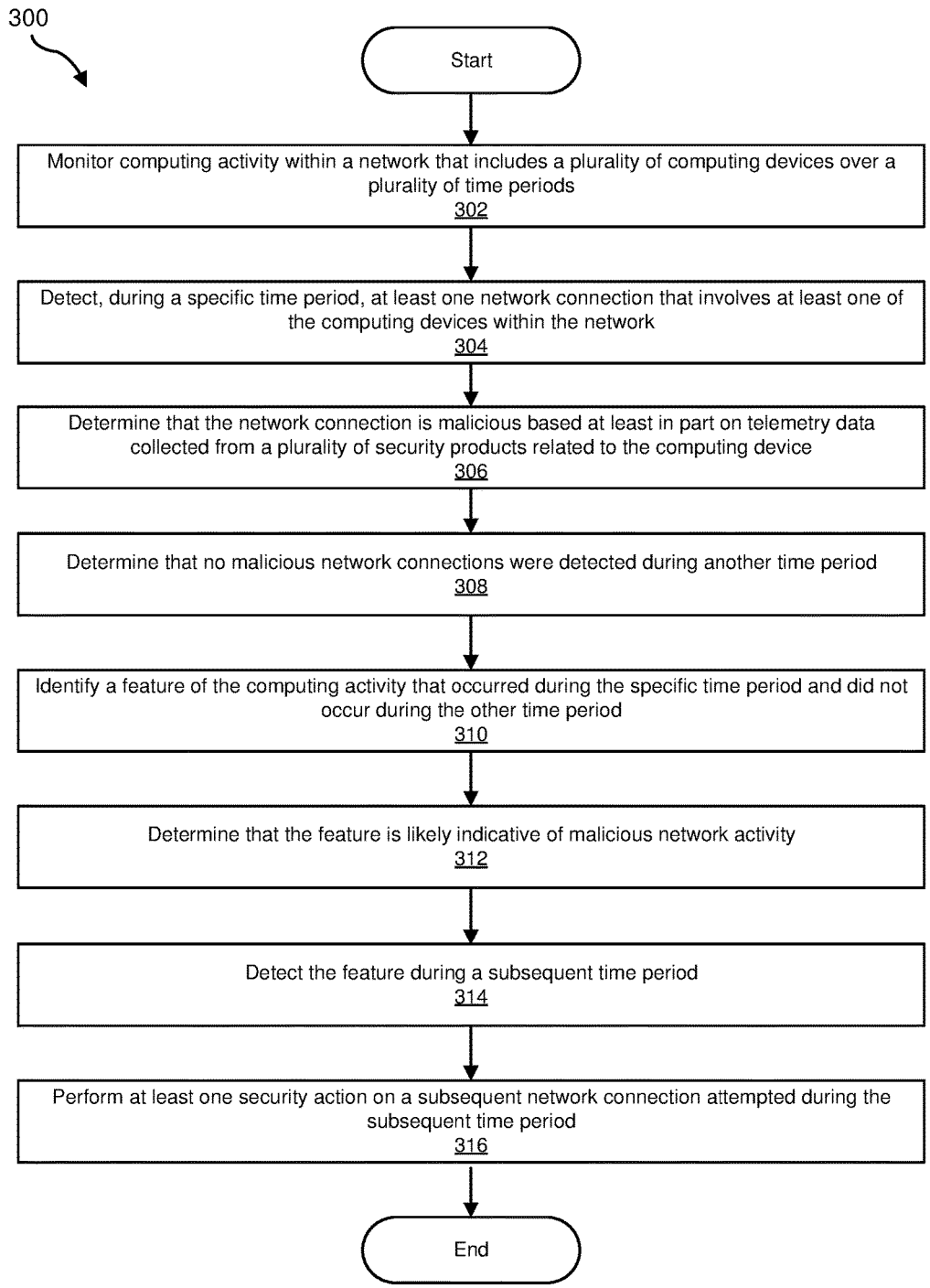
FIG. 3 is a flow diagram of an example method for preventing malicious network connections using correlation-based anomaly detection.

FIG. 3 is a flow diagram of an example computer-implemented method 300 for preventing malicious network connections using correlation-based anomaly detection. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may monitor computing activity within a network that includes a plurality of computing devices over a plurality of time periods. For example, monitoring module 104 may, as part of one or more of computing devices 202(1)-(N) and/or server 206 in FIG. 2, monitor computing activity within network 204. In one example, computing activity may include and/or represent any network connections attempted and/or established among computing devices 202(1)-(N) and/or between one or more of computing devices 202(1)-(N) and another computing device that is external to network 204. Additionally or alternatively, computing activity may include and/or represent events that occur on computing devices involved in such network connections and/or features or characteristics of those computing devices or their corresponding environments during such network connections.

The systems described herein may perform step 302 in a variety of ways and/or contexts. In some examples, monitoring module 104 may monitor the computing activity on computing devices 202(1)-(N) for certain events that occur on such devices and/or features or characteristics of such devices. For example, monitoring module 104 may monitor computing device 202(1) for any new or current network connections. Upon detecting any new or current network connections involving computing device 202(1), monitoring module 104 may attempt to identify the other device with which computing device 202(1) has established the network connection.

Additionally or alternatively, monitoring module 104 may attempt to determine the protocol used in the network connection. Monitoring module 104 may also attempt to identify certain features of the network connection and/or the corresponding environment. Examples of such features include, without limitation, events occurring around the same time as the network connection, the country from which network traffic originated, the volume of certain remote access behaviors (such as SSH, VNC, and/or FTP) related to the network connection, sequential behavior properties or constructs found in a data set related to the network connection, n-grams of sequential behavior properties or constructs, the time of the network connection (such as the time of day and/or the day of week), graph statistics (such as indegrees, outdegrees, and/or structures of 1 or 2 hop neighborhoods) extracted from a graph structure constructed using certain network connections, the number of internal and/or external machines connected to computing device 202(1), the health and/or hygiene history of machines connected to computing device 202(1), combinations or variations of one or more of the same, and/or any other meaningful features.

In some examples, monitoring module 104 may collect and/or compile various data, information, and/or features about the computing activity occurring within the network via a plurality of different security products. For example, monitoring module 104 may represent part of an MSS that collects and/or compiles security-related data from antivirus software running on computing devices 202(1)-(N), network security systems running on one or more devices that facilitate the transfer of traffic within network 204, distributed security systems whose components are distributed across computing devices 202(1)-(N) and server 206, Data Loss Prevention (DLP) systems, firewalls, Intrusion Detection Systems (IDSes), Intrusion Prevention Systems (IPSes), reputation-based security systems, combinations or variations of one or more of the same, and/or any other suitable security product related to one or more of computing devices 202(1)-(N), server 206, and/or network 204.

Returning to FIG. 3, at step 304 one or more of the systems described herein may detect, during a specific time period, at least one network connection that involves at least one of the computing devices within the network. For example, monitoring module 104 may, as part of one or more of computing devices 202(1)-(N) and/or server 206 in FIG. 2, detect at least one network connection that involves computing device 202(1) during a specific time period. In one example, this time period may include and/or represent a specific day (such as Monday, 28 Nov. 2016).

The systems described herein may perform step 304 in a variety of ways and/or contexts. In some examples, monitoring module 104 may detect the network connection based at least in part on traffic that is originating from and/or destined for computing device 202(1). For example, monitoring module 104 may monitor the communication ports and/or drivers on computing device 202(1). In this example, monitoring module 104 may detect network activity on one or more of the communication ports and/or drivers on computing device 202(1). Monitoring module 104 and/or determination module 106 may then determine that computing device 202(1) has an active network connection since network activity has been detected on one or more of the communication ports on computing device 202(1).

In some examples, monitoring module 104 may identify the point in time that the network connection begins and/or ends. For example, monitoring module 104 may detect a change in network activity on one or more communication ports on computing device 202(1). In one example, a communication port on computing device 202(1) may be inactive and/or have little or no network activity at a certain point in time. In this example, the communication port may later become active and/or begin transferring communications on behalf of computing device 202(1). Monitoring module 104 may detect this change in network activity on the communication port and/or make a record of this change in data set 120.

Additionally or alternatively, a communication port on computing device 202(1) may be active and/or be facilitating the transfer of communications on behalf of computing device 202(1). In this example, the communication port may later become inactive and/or stop transferring communications on behalf of computing device 202(1). Monitoring module 104 may detect this change in network activity on the communication port and/or make a record of this change in data set 120.

Returning to FIG. 3, at step 306 one or more of the systems described herein may determine that the network connection is malicious based at least in part on telemetry data collected from a plurality of security products related to the computing device. For example, determination module 106 may, as part of one or more of computing devices 202(1)-(N) and/or server 206 in FIG. 2, determine that the network connection is malicious based at least in part on telemetry data collected from a plurality of security products related to the computing device. Such security products may be installed and/or running on any or all of computing devices 202(1)-(N), server 206, and/or network 204.

The systems described herein may perform step 306 in a variety of ways and/or contexts. In some examples, determination module 106 may determine that the network connection is malicious by analyzing and/or mining telemetry data collected from the various security products. For example, monitoring module 104 may collect telemetry data that identifies certain security events and/or characteristics of the corresponding computing environments protected by the various security products. Such security events may include and/or represent buffer overflows, computing errors, payload drops, virus detections, behavioral anomalies, combinations or variations of one or more of the same, and/or any other security events.

As a specific example, a firewall running within network 204 may detect suspicious activity originating from a network connection involving computing device 202(1). In this example, monitoring module 104 may then receive some sort of notification identifying this suspicious activity from the firewall. Monitoring module 104 and/or determination module 106 may determine that the network connection is malicious in view of the notification and/or other telemetry data represented in data set 120.

Additionally or alternatively, antivirus software running on computing device 202(1) may detect a malicious payload drop on computing device 202(1) around the time that a network connection in question was established. The antivirus software may later determine that this network connection was responsible for the malicious payload drop. In other words, the antivirus software may determine that the malicious payload was transferred to computing device 202(1) by way of the network connection. In this example, monitoring module 104 may then receive some sort of notification about the malicious payload and/or the network connection from the antivirus software. Monitoring module 104 and/or determination module 106 may determine that the network connection is malicious in view of the notification and/or other telemetry data represented in data set 120.

In other examples, monitoring module 104 may analyze a network connection in view of certain policies that apply to such network connections. For example, monitoring module 104 may detect an SSH network connection between computing device 202(1) and computing device 202(N). In this example, computing device 202(1) may correspond and/or belong to the Human Resources (HR) department of an enterprise and/or be operated by an HR employee of the enterprise. The enterprise's security products may implement a policy that prevents HR-related devices and/or HR employees from establishing SSH network connections. As a result, monitoring module 104 may classify the SSH network connection between computing device 202(1) and computing device 202(N) as malicious. Accordingly, monitoring module 104 or determination module 106 may determine that the SSH network connection is actually malicious because the policy prevents HR-related devices and/or HR employees from establishing SSH network connections.

In some examples, monitoring module 104 may analyze a network connection in view of historical behavior of one of the computing devices involved in the network connection. For example, monitoring module 104 may identify a baseline of behavior and/or computing activity for computing device 202(1). In this example, monitoring module 104 may classify, quantify, and/or otherwise analyze the behavior of computing device 202(1) and/or the corresponding computing activity around the time of and/or during the network connection. Monitoring module 104 may then compare that behavior and/or the corresponding computing activity with the baseline of behavior and/or computing activity.

As a result of this comparison, monitoring module 104 or determination module 106 may determine that the distance between the baseline behavior and the behavior around the time of and/or during the network connection vary fairly drastically. In other words, monitoring module 104 or determination module 106 may determine that the behavior around the time of and/or during the network connection represents a great deviation from the baseline behavior. Monitoring module 104 or determination module 106 may then determine that the network connection is actually malicious based at least in part on the great deviation in behavior between the baseline and the time of network connection.

Returning to FIG. 3, at step 308 one or more of the systems described herein may determine that no malicious network connections were detected during another time period. For example, determination module 106 may, as part of one or more of computing devices 202(1)-(N) and/or server 206 in FIG. 2, determine that no malicious network connections involving computing device 202(1) were detected during another time period. In other words, determination module 106 may fail to find enough evidence that indicates that any network connections involving computing device 202(1) during that time period were malicious.

The systems described herein may perform step 308 in a variety of ways and/or contexts. In some examples, determination module 106 may determine that no malicious network connections involving computing device 202(1) were detected during the other time period based at least in part on the various security products implemented on computing device 202(1) or in connection with computing device 202(1). For example, the firewall running within network 204 may determine that none of the network connections involving computing device 202(1) during the other time period are malicious. In one example, determination module 108 may receive some sort of notification indicating that none of those network connections are malicious from the firewall. As a result, determination module 108 may determine that no malicious network connections involving computing device 202(1) were detected during the other time period.

Additionally or alternatively, the antivirus software running on computing device 202(1) may fail to detect any malicious payload drops on computing device 202(1) while the network connections involving computing device 202(1) were active during the other time period. In one example, determination module 108 may receive some sort of notification indicating that none of those network connections are malicious from the antivirus software. As a result, determination module 108 may determine that no malicious network connections involving computing device 202(1) were detected during the other time period.

Returning to FIG. 3, at step 310 one or more of the systems described herein may identify a feature of the computing activity that occurred during the specific time period and did not occur during the other time period. For example, identification module 108 may, as part of one or more of computing devices 202(1)-(N) and/or server 206 in FIG. 2, identify feature 122(1) as having occurred during the specific time period but not having occurred during the other time period. Accordingly, feature 122(1) may have occurred around the same time as the malicious network connection.

The systems described herein may perform step 310 in a variety of ways and/or contexts. In some examples, identification module 108 may identify feature 122(1) as having been detected during the specific time period. For example, identification module 108 may identify feature 122(1) as having occurred on "Day 1" of monitoring. In this example, identification module 108 or determination module 106 may determine that feature 122(1) did not occur on "Day 2" of monitoring. As a result, identification module 108 may identify feature 122(1) as having occurred on "Day 1" of monitoring but not on "Day 2" of monitoring.

In some examples, feature 122(1) may have occurred during at least one time period in which no malicious network connections were detected. In one example, determination module 106 may determine that no malicious network connections involving computing device 202(1) were detected during an additional time period. For example, identification module 108 may identify feature 122(1) as having occurred on "Day 15" of monitoring even though no malicious network connections involving computing device 202(1) were detected on "Day 15" of monitoring. However, determination module 106 may determine that feature 122(1) occurred less than a threshold number of times (e.g., less than two times) on "Day 15" of monitoring. Accordingly, the mere occurrence of feature 122(1) during a time period in which no malicious network connections were detected may not necessarily preclude and/or eliminate feature 122(1) from being used to detect and/or classify future network connections as malicious.

Returning to FIG. 3, at step 312 one or more of the systems described herein may determine that the feature is likely indicative of malicious network activity due at least in part to the feature having occurred during the specific time period and not having occurred during the other time period. For example, determination module 106 may, as part of one or more of computing devices 202(1)-(N) and/or server 206 in FIG. 2, determine that feature 122(1) is likely indicative of malicious network activity due at least in part to feature 122(1) having occurred during the specific time period but not having occurred during the other time period. In other words, feature 122(1) may be indicative and/or suggestive of a malicious network connection. Accordingly, the presence and/or detection of feature 122(1) at a subsequent point in time may indicate and/or suggest that a malicious network connection is likely to occur and/or be attempted at or around that same time.

The systems described herein may perform step 312 in a variety of ways and/or contexts. In some examples, determination module 106 may arrive at the determination that feature 122(1) is likely indicative of malicious network activity by correlating feature 122(1) with malicious network activity. For example, determination module 106 may correlate feature 122(1) with malicious network activity because feature 122(1) was present while the malicious network connection existed but was not present during the other time period when no malicious network connections existed. In other words, in the event that certain features are present only during time periods when malicious network connections exist, these features may be indicative and/or suggestive of malicious network connections. However, in the event that some features occur and/or are present during time periods when no malicious network connections existed, these features may not necessarily be indicative and/or suggestive of malicious network connections.

In some examples, one or more of the systems described herein may compile a data set that identifies the feature of the computing activity that occurred during the specific time period and at least one other feature of the computing activity that occurred during the other time period. For example, compiling module 112 may, as part of one or more of computing devices 202(1)-(N) and/or server 206 in FIG. 2, compile and/or collect data set 120. In one example, data set 120 may include and/or represent data and/or information about the computing activity within the network during certain time periods. Additionally or alternatively, data set 120 may include and/or represent features 122(1)-(N).

Figure 4:
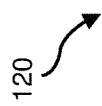
FIG. 4 is an illustration of an example data set that identifies certain features that occurred during the same time period as certain malicious incidents.

As a specific example, compiling module 112 may compile data set 120 in FIG. 4. As illustrated in FIG. 4, data set 120 may be organized and/or arranged in a table that includes a set of rows representative of different time periods for a specific machine (in this example, "Machine$_K$-Day$_L$", "Machine$_K$-Day$_{L+1}$", and "Machine$_M$-Day$_N$"), a set of columns representative of different features of computing activity (in this example, "Feature$_1$", "Feature$_2$", and "Feature$_I$"), and a column representative of the number of malicious incidents detected during the corresponding time period (in this example, "# of Malicious Incidents"). In this example, data set 120 may identify "3" malicious events as having occurred during "Day$_L$" in connection with "Machine$_K$" and "0" malicious events as having occurred during "Day$_{L+1}$" in connection with "Machine$_K$". In addition, data set 120 may identify "1" instance of "Feature$_1$" as having been detected during "Day$_L$" in connection with "Machine$_K$" and "2" instances of "Feature$_2$" as having been detected during "Day$_L$" in connection with "Machine$_K$". Moreover, data set 120 may identify "2" instances of "Feature$_1$" as having been detected during "Day$_{L+1}$" in connection with "Machine$_K$" and "0" instances of "Feature$_2$" as having been detected during "Day$_{L+1}$" in connection with "Machine$_K$".

As another example, compiling module 112 may compile data set 500 in FIG. 5. As illustrated in FIG. 5, data set 500 may be organized and/or arranged in a table that includes the same columns and rows as data set 120 in FIG. 4 with the addition of a column representative of the corresponding type or category of machine (in this example, "Machine Category"). In this example, data set 500 may identify the same number of features and malicious events as identified in data set 120 in FIG. 4. In addition, data set 500 may identify "Machine$_K$" as being of type or category "1" and "Machine$_M$" as being of type or category "2".

As a further example, compiling module 112 may compile data set 600 in FIG. 6. As illustrated in FIG. 6, data set 600 may be organized and/or arranged in a table that includes the same columns and rows as data set 500 in FIG. 5 with the addition of a column representative of the amount of deviation between the machine's baseline computing activity and the machine's computing activity during the corresponding time period. In this example, data set 500 may identify the same number of features and malicious events as identified in data set 120 in FIG. 4 and data set 500 in FIG. 5. In addition, data set 600 may identify "Machine$_K$" as being of type or category "1" and having a deviation of "0.95" from the baseline during "Day$_L$" and a deviation of "0" from the baseline during "Day$_{L+1}$". Data set 600 may also identify "Machine$_M$" as being of type or category "2" and having a deviation of "0.01" from the baseline during "Day$_N$".

In some examples, one or more of the systems described herein may train a malicious-anomaly-detection model that facilitates detecting malicious network activity based at least in part on the data set. For example, training module 114 may, as part of one or more of computing devices 202(1)-(N) and/or server 206 in FIG. 2, train malicious-anomaly-detection model 222 with data set 120, data set 500, or data set 600. Upon completion of this training, malicious-anomaly-detection model 222 may facilitate detecting future malicious network connections based on the features that were present only during time periods in which known malicious network connections occurred. Examples of malicious-anomaly-detection model 222 include, without limitation, heuristics, classifiers, decision trees, Bloom filters, combinations or variations of one or more of the same, and/or any other suitable model that facilitates detecting malicious network activity.

In one example, data set 120 may include only data, information, and/or features that are specific to computing device 202(1). In this example, training module 114 may train malicious-anomaly-detection model 222 specifically for application on computing device 202(1). In other words, malicious-anomaly-detection model 222 may represent a per-machine model for computing device 202(1).

In another example, data set 120 may include only data, information, and/or features that are specific to computing devices of a certain machine type or category. For example, data set 120 may include only data that is specific to devices belonging to the Information Technology (IT) department of an enterprise. Additionally or alternatively, data set 120 may include only data that is specific to mobile devices. In either case, training module 114 may train malicious-anomaly-detection model 222 specifically for application on computing devices of the corresponding machine type or category.

In a further example, data set 120 may include data, information, and/or features collected from computing devices of a plurality of machine types. For example, data set 120 may include data collected from all of the devices belonging to a specific enterprise. Additionally or alternatively, data set 120 may include data collected from various devices connected to the Internet across the world. Accordingly, malicious-anomaly-detection model 222 may represent an enterprise-specific model or a global model.

Returning to FIG. 3, at step 314 one or more of the systems described herein may detect the feature at a subsequent point in time. For example, monitoring module 104 may, as part of one or more of computing devices 202(1)-(N) and/or server 206 in FIG. 2, detect feature 122(1) at a subsequent point in time. In other words, this subsequent point in time may include and/or represent any time and/or moment that occurs after feature 122(1) has been identified as likely being indicative of malicious network activity.

The systems described herein may perform step 314 in a variety of ways and/or contexts. In some examples, monitoring module 104 may detect the presence of feature 122(1) at the subsequent point in time based at least in part on one or more of the security products deployed on computing devices 202(1)-(N) and/or server 206 or within network 204. For example, the firewall running within network 204 may detect the presence of feature 122(1) at some point in time after feature 122(1) has been identified as likely being indicative of malicious network activity. In one example, monitoring module 104 may receive some sort of notification indicating that feature 122(1) has been detected from the firewall. As a result, monitoring module 104 may determine that feature 122(1) is present at that point in time.

Additionally or alternatively, antivirus software running on computing device 202(1) may detect the presence of feature 122(1) at some point in time after feature 122(1) has been identified as likely being indicative of malicious network activity. In this example, monitoring module 104 may receive some sort of notification indicating that feature 122(1) has been detected from the antivirus software running on computing device 202(1). As a result, monitoring module 104 may determine that feature 122(1) is present at that point in time.

In some examples, monitoring module 104 may detect the presence of feature 122(1) in conjunction with a different computing device than the one involved in the malicious network connection from step 304. For example, antivirus software running on computing device 202(N) may detect the presence of feature 122(1). In one example, monitoring module 104 may receive some sort of notification indicating that feature 122(1) has been detected from the antivirus software running on computing device 202(N). As a result, monitoring module 104 may determine that feature 122(1) is present on computing device 202(N) at that point in time.

Returning to FIG. 3, at step 316 one or more of the systems described herein may perform at least one security action on a subsequent network connection attempted around the subsequent point in time in response to the detection of the feature at the subsequent point in time. For example, security module 110 may, as part of one or more of computing devices 202(1)-(N) and/or server 206 in FIG. 2, perform at least one security action on a subsequent network connection attempted at or around the subsequent point in time. In this example, security module 110 may initiate this security action in response to the detection of feature 122(1) at the subsequent point in time. Security module 110 may expect and/or anticipate a malicious or suspicious network connection due at least in part to the detection of feature 122(1) at the subsequent point in time.

The systems described herein may perform step 316 in a variety of ways and/or contexts. In some examples, security module 110 may prevent and/or terminate a subsequent network connection attempted at or around the same time as the detection of feature 122(1). In one example, monitoring module 104 may detect a subsequent network connection attempted within a certain amount of time of the subsequent point in time. For example, monitoring module 104 may detect feature 122(1) at the subsequent point in time and then detect the subsequent network connection less than a minute later. Alternatively, monitoring module 104 may detect the subsequent network connection at a certain time and then detect feature 122(1) less than thirty seconds later. Accordingly, monitoring module 104 and/or determination module 106 may correlate feature 122(1) and the subsequent network connection with one another due at least in part to their co-occurrence.

In some examples, monitoring module 104 may analyze the subsequent network connection by applying malicious-anomaly-detection model 222 to the subsequent network connection. Determination module 106 may then determine that the subsequent network connection is malicious based at least in part on this analysis.

In some examples, security module 110 may classify the subsequent network connection as malicious or suspicious. In other examples, security module 110 may subject the subsequent network connection to increased security measures (such as deep packet inspection). Additionally or alternatively, security module 110 may subject the network connection to increased authentication and/or verification measures (such as three-factor authentication). In certain examples, security module 110 may report the subsequent network connection as being malicious or suspicious to an administrator.

In some examples, identification module 108 may identify a machine type of a computing device involved in the subsequent network connection. In one example, the subsequent network connection may involve computing device 202(1). Additionally or alternatively, the subsequent network connection may involve computing device 202(N). In such examples, determination module 106 may determine that the subsequent network connection is malicious based at least in part on the machine type of the computing device involved in the subsequent network connection. For example, determination module 106 may determine that the machine type of the computing device involved in the subsequent network connection matches the machine type of computing device 202(1) involved in the malicious connection. In other words, the presence of feature 122(1) on such a machine type may be indicative or suggestive of a malicious connection. Accordingly, determination module 106 may determine that the subsequent network connection is malicious due at least in part to the machine type of the involved computing device matching the machine type of computing device 202(1).

Figure 7:
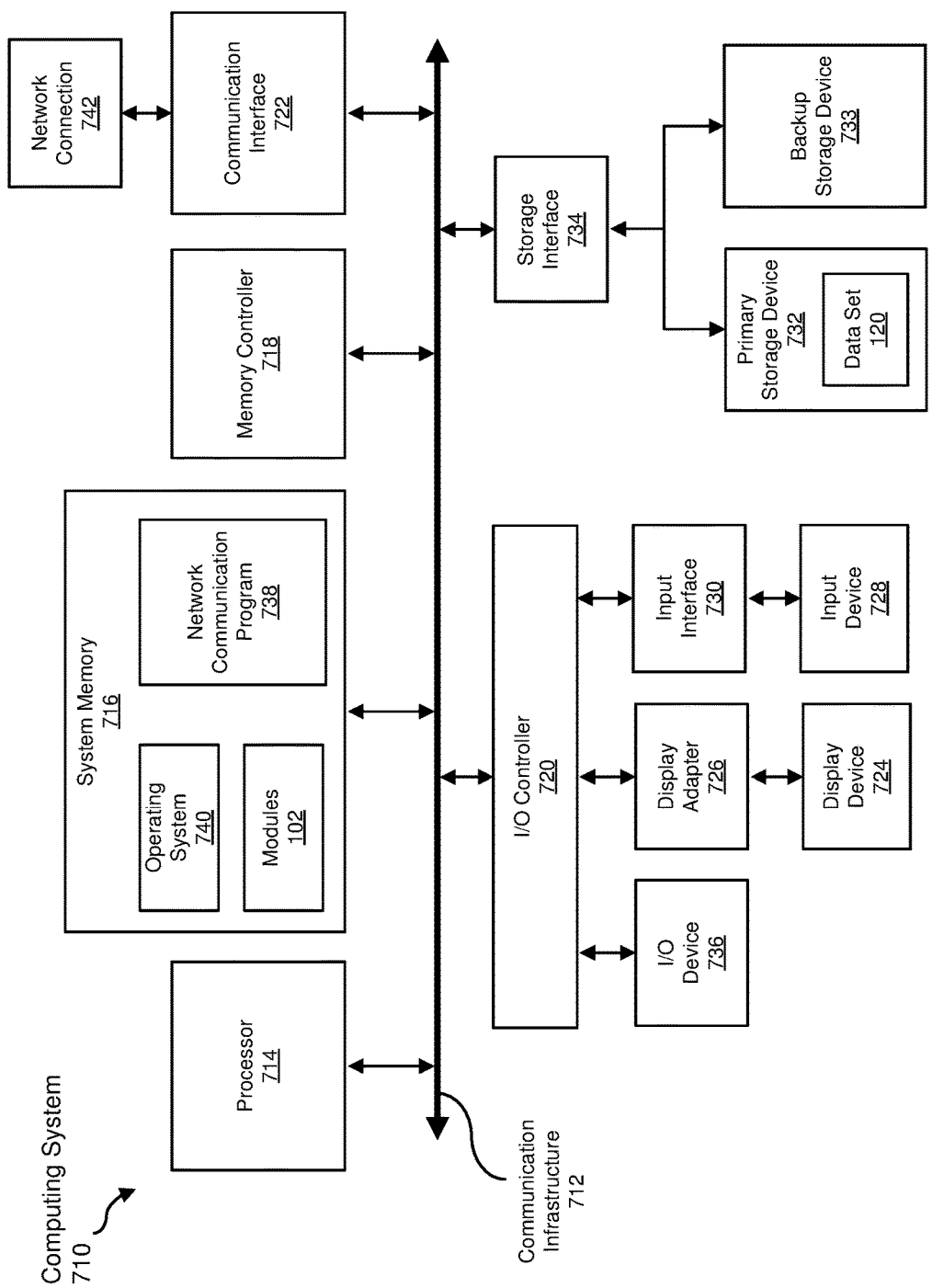
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data set 120 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
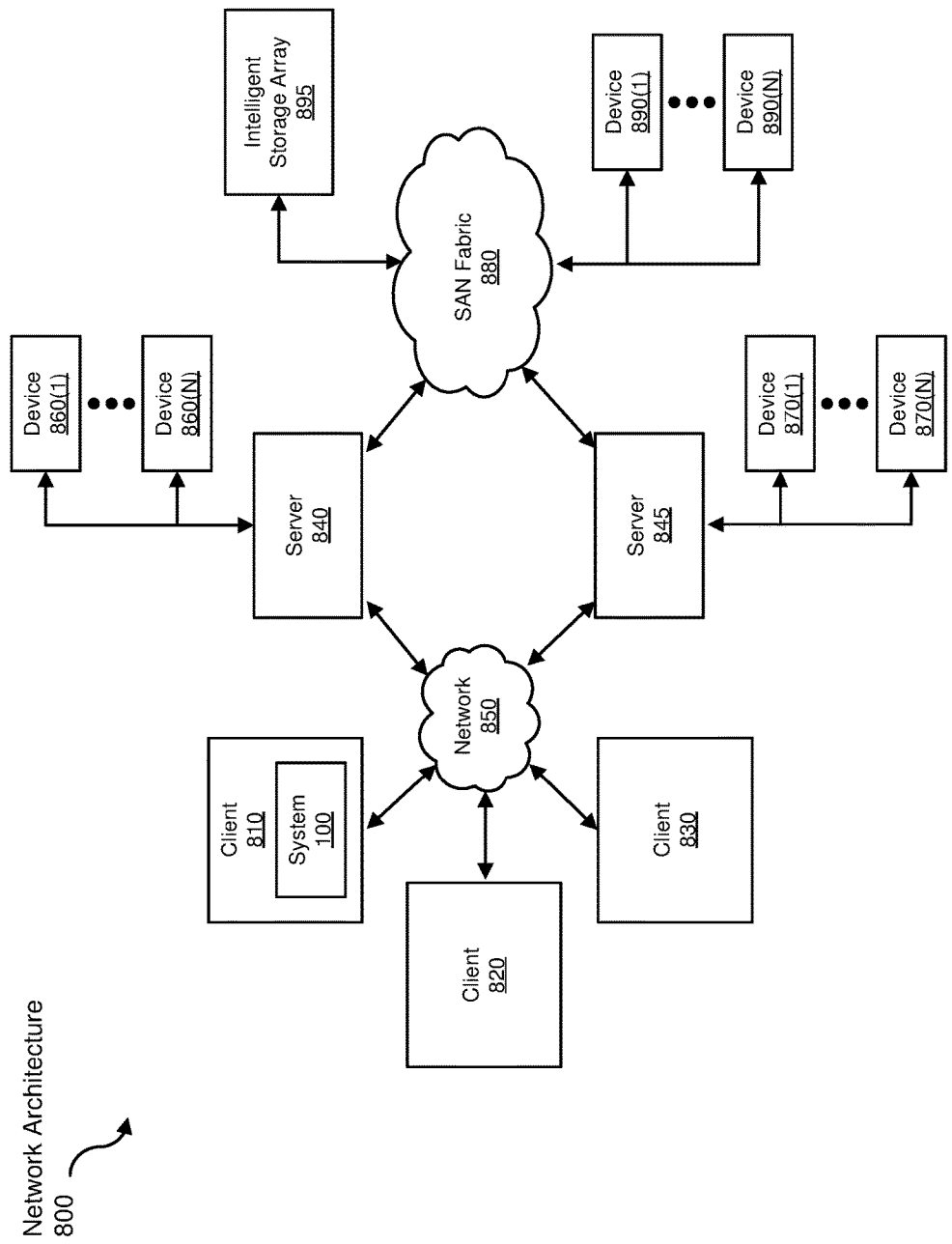
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for preventing malicious network connections using correlation-based anomaly detection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data to be transformed, transform the data, output a result of the transformation, use the result of the transformation to detect malicious network connections, and store the result of the transformation for future reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing malicious network connections using correlation-based anomaly detection, at least a portion of the method being performed by a computing device comprising at least one processor, the method comprising:
   monitoring computing activity within a network that includes a plurality of computing devices over a plurality of time periods;
   while monitoring the computing activity within the network:
      detecting, during a first time period, at least one network connection that involves at least one of the computing devices within the network;
      determining that the network connection detected during the first time period is malicious based at least in part on telemetry data collected from a plurality of security products related to the computing device;
      determining that no malicious network connections involving the computing device were detected during a second time period;
   identifying a feature of the computing activity that:
      occurred during the first time period; and
      did not occur during the second time period;
   determining that the feature is likely indicative of malicious network activity due at least in part to the feature having occurred during the first time period and not having occurred during the second time period;

detecting, after the first time period and the second time period, a presence of the feature in connection with a subsequent network connection at a subsequent point in time; and in response to detecting the presence of the feature in connection with the subsequent network connection at the subsequent point in time:
classifying the subsequent network connection as malicious; and
performing at least one security action on the subsequent network connection attempted around the subsequent point in time.

2. The method of claim 1, further comprising:
compiling a data set that identifies:
the feature of the computing activity that occurred during the first time period; and
at least one other feature of the computing activity that occurred during the second time period; and
training a malicious-anomaly-detection model that facilitates detecting malicious network activity based at least in part on the data set.

3. The method of claim 2, further comprising:
detecting the subsequent network connection attempted around the subsequent point in time;
analyzing the subsequent network connection by applying the malicious-anomaly-detection model to the subsequent network connection; and
determining, based at least in part on the analysis, that the subsequent network connection is malicious.

4. The method of claim 2, wherein compiling the data set comprises collecting data about the computing device involved in the malicious network connection via a plurality of security products related to the computing device.

5. The method of claim 2, wherein the data set identifies a machine type of the computing device involved in the malicious network connection; and
further comprising identifying a machine type of another computing device involved in the subsequent network connection;
wherein determining that the subsequent network connection is malicious comprises:
determining that the machine type of the other computing device matches the machine type of the computing device; and
determining, based at least in part on the machine type of the other computing device matching the machine type of the computing device, that the subsequent network connection is malicious.

6. The method of claim 2, wherein the data set identifies a machine type of the computing device involved in the malicious network connection; and
wherein determining that the network connection is malicious comprises determining, based at least in part on the machine type of the computing device, that the malicious network connection is malicious; and
wherein determining that the feature is likely indicative of malicious network activity comprises determining that the feature is likely indicative of malicious network activity due at least in part to the machine type of the computing device.

7. The method of claim 2, wherein the data set includes a representation of an amount of deviation in computing behavior of the computing device involved in the malicious network connection over the first and second time periods; and
wherein determining that the network connection is malicious comprises determining, based at least in part on the amount of deviation in the computing behavior of the computing device during the first time period, that the malicious network connection is malicious; and
wherein determining that the feature is likely indicative of malicious network activity comprises determining that the feature is likely indicative of malicious network activity due at least in part to the amount of deviation in the computing behavior of the computing device during the first time period.

8. The method of claim 2, wherein:
the data set includes only data that is specific to the computing device involved in the malicious network connection; and
the malicious-anomaly-detection model is trained specifically for application on the computing device.

9. The method of claim 2, wherein:
the data set includes only data that is specific to computing devices of a certain machine type; and
the malicious-anomaly-detection model is trained specifically for application on computing devices of the certain machine type.

10. The method of claim 2, wherein:
the data set includes data collected from computing devices of a plurality of machine types; and
the malicious-anomaly-detection model is trained for application on computing devices of the plurality of machine types.

11. The method of claim 1, further comprising:
determining that no malicious network connections involving the computing device were detected during a third time period; and
determining that the feature of the computing activity occurred less than a threshold number of times during the third time period.

12. A system for preventing malicious network connections using correlation-based anomaly detection, at least a portion of the method being performed by a computing device comprising at least one processor, the method comprising:
a monitoring module, stored in memory, that:
monitors computing activity within a network that includes a plurality of computing devices over a plurality of time periods; and
detects, during a first time period, at least one network connection that involves at least one of the computing devices within the network;
a determination module, stored in memory, that:
determines that the network connection detected during the first time period is malicious based at least in part on telemetry data collected from a plurality of security products related to the computing device;
determines that no malicious network connections involving the computing device were detected during a second time period;
an identification module, stored in memory, that identifies a feature of the computing activity that:
occurred during the first time period; and
did not occur during the second time period;
wherein:
the determination module determines that the feature is likely indicative of malicious network activity due at least in part to the feature having occurred during the first time period and not having occurred during the second time period; and
the monitoring module detects, after the first time period and the second time period, a presence of the feature in connection with a subsequent network connection at a subsequent point in time;

a security module, stored in memory, that:
classifies the subsequent network connection as malicious in response to the detection of the presence of the feature in connection with the subsequent network connection at the subsequent point in time; and
performs at least one security action on the subsequent network connection attempted around the subsequent point in time due at least in part to the subsequent network connection being classified as malicious; and at least one physical processor configured to execute the monitoring module, the determination module, the identification module, and the security module.

13. The system of claim 12, further comprising:
a compiling module, stored in memory, that compiles a data set that identifies:
the feature of the computing activity that occurred during the first time period; and
at least one other feature of the computing activity that occurred during the second time period;
a training module, stored in memory, that trains a malicious-anomaly-detection model that facilitates detecting malicious network activity based at least in part on the data set; and
wherein the physical processor is further configured to execute the compiling module and the training module.

14. The system of claim 13, wherein:
the monitoring module detects the subsequent network connection attempted around the subsequent point in time; and
the determination module:
analyzes the subsequent network connection by applying the malicious-anomaly-detection model to the subsequent network connection; and
determines, based at least in part on the analysis, that the subsequent network connection is malicious.

15. The system of claim 13, wherein the compiling module collects data about the computing device involved in the malicious network connection via a plurality of security products related to the computing device.

16. The system of claim 13, wherein:
the data set identifies a machine type of the computing device involved in the malicious network connection;
the identification module identifies a machine type of another computing device involved in the subsequent network connection; and
the determination module:
determines that the machine type of the other computing device matches the machine type of the computing device; and
determines, based at least in part on the machine type of the other computing device matching the machine type of the computing device, that the subsequent network connection is malicious.

17. The system of claim 13, wherein:
the data set identifies a machine type of the computing device involved in the malicious network connection; and
the determination module:
determines, based at least in part on the machine type of the computing device, that the malicious network connection is malicious; and
determines that the feature is likely indicative of malicious network activity comprises determining that the feature is likely indicative of malicious network activity due at least in part to the machine type of the computing device.

18. The system of claim 13, wherein:
the data set includes a representation of an amount of deviation in computing behavior of the computing device involved in the malicious network connection over the first and second time periods; and
the determination module:
determines, based at least in part on the amount of deviation in the computing behavior of the computing device during the first time period, that the malicious network connection is malicious; and
determines that the feature is likely indicative of malicious network activity due at least in part to the amount of deviation in the computing behavior of the computing device during the first time period.

19. The system of claim 13, wherein:
the data set includes only data that is specific to the computing device involved in the malicious network connection; and
the malicious-anomaly-detection model is trained specifically for application on the computing device.

20. A non-transitory computer-readable medium comprising one or more computer-executable instructions that, when executed by at least one processor of a computing device, cause the computing device to:
monitor computing activity within a network that includes a plurality of computing devices over a plurality of time periods;
detect, during a first time period, at least one malicious network connection that involves at least one of the computing devices within the network;
determine that no malicious network connections involving the computing device were detected during the second time period;
determine that the network connection detected during the first time period is malicious based at least in part on telemetry data collected from a plurality of security products related to the computing device;
identify a feature of the computing activity that:
occurred during the first time period; and
did not occur during the second time period;
determine that the feature is likely indicative of malicious network activity due at least in part to the feature having occurred during the first time period and not having occurred during the second time period;
detect, after the first time period and the second time period, a presence of the feature in connection with a subsequent network connection at a subsequent point in time; and
in response to detecting the presence of the feature in connection with the subsequent network connection at the subsequent point in time:
classify the subsequent network connection as malicious; and
perform at least one security action on the subsequent network connection attempted around the subsequent point in time.

* * * * *